United States Patent [19]

Kubota et al.

[11] Patent Number: 5,654,114

[45] Date of Patent: Aug. 5, 1997

[54] NONAQUEOUS SECONDARY BATTERY

[75] Inventors: Tadahiko Kubota; Mitsutoshi Tanaka, both of Minami-ashigara, Japan

[73] Assignee: Fuji Photo Film Co., Ltd., Kanagawa, Japan

[21] Appl. No.: 409,045

[22] Filed: Mar. 23, 1995

[30] Foreign Application Priority Data

Mar. 25, 1994 [JP] Japan .................. 6-055614

[51] Int. Cl.$^6$ .................. H01M 4/48; H01M 4/52
[52] U.S. Cl. .................. 429/218; 429/94
[58] Field of Search .................. 429/218, 144, 429/208, 243, 246, 245, 94

[56] References Cited

U.S. PATENT DOCUMENTS

| | | | |
|---|---|---|---|
| 2,954,417 | 9/1960 | Lehovec et al. | 429/94 |
| 5,053,297 | 10/1991 | Yamahira et al. | 429/194 |
| 5,286,582 | 2/1994 | Tahara et al. | 429/218 |
| 5,344,724 | 9/1994 | Ozaki et al. | 429/94 |
| 5,378,560 | 1/1995 | Tomiyama | 429/217 |
| 5,395,711 | 3/1995 | Tahara et al. | 429/197 |
| 5,401,599 | 3/1995 | Tahara et al. | 429/229 X |

FOREIGN PATENT DOCUMENTS

| | | |
|---|---|---|
| 0582173 | 2/1994 | European Pat. Off. . |
| 0615296 | 9/1994 | European Pat. Off. . |

OTHER PUBLICATIONS

Grant, ed. *Hackh's Chemical Dictionary*, McGraw Hill Book Company, p. 604 (1972) no month available.
Lewis, ed. *Hawley's Condensed Chemical Dictionary*, 12th edition, Van Nostrand Reinhold Company, 1993, pp. 151, 686, and 1151. no month available.

*Primary Examiner*—Prince Willis, Jr.
*Assistant Examiner*—Carol Chaney
*Attorney, Agent, or Firm*—Sughrue, Mion, Zinn, Macpeak & Seas

[57] ABSTRACT

There is disclosed a nonaqueous secondary battery comprising, as a negative-electrode-active material, an oxide mainly comprising at least one of semimetals of the group IVB or VB of the periodic table, which is capable of intercalating and deintercalating lithium, in which (1) a positive-electrode-active material is a cobalt oxide, having an average grain size (D) represented by the formula:

$3 < D \leq 9.0 \ \mu m$, and the volume of the cobalt oxide, which is occupied by grains of from 3 to 15 μm, being not less than 80% of the total volume, and a nonaqueous electrolyte comprises a lithium salt; or (2) a positive electrode and a negative electrode are set up in a swirl form and the width of the negative electrode is wider by a range of from 0.2 mm to 5 mm than that of the positive electrode. The nonaqueous secondary battery of the invention exhibits high discharge potential, a large discharge capacity, satisfactory charge-and-discharge cycle characteristics, and high safety.

10 Claims, 1 Drawing Sheet

FIG. 1

NONAQUEOUS SECONDARY BATTERY

FIELD OF THE INVENTION

The present invention relates to a nonaqueous secondary battery having improved charge and discharge cycle characteristics and increased safety.

BACKGROUND OF THE INVENTION

As an example of using $SnO_2$ or an Sn compound as an active material of a lithium battery, JP-A ("JP-A" means unexamined published Japanese patent application) No. 219465/1987 discloses adding $SnO_2$ to $\alpha\text{-}Fe_2O_3$, which is a negative-electrode (anode)-active material of the secondary battery, with a preferable addition amount of $SnO_2$ being 0.5 to 10 mol %. Additionally, JP-A No. 136131/1970 discloses that $LicoO_2$-series compounds, as positive-electrode (cathode)-active materials, provide high energy density.

On the other hand, these active materials are powdered materials, and therefore they are mixed and kneaded with a conducting agent, a binder, and so on, to obtain a mixture, and then the mixture is coated on a support.

In this case, these active materials, having a large grain size, have caused some problems, such as damage to the support at a coating and scratching on a separator when the active materials are rolled with a negative electrode and a separator, which results in short-circuiting. A method of solving such problems is described in JP-A No. 62713/1993. JP-A No. 304664/1989 discloses a nonaqueous electrolytic solution battery employing $LiCoO_2$ having an average grain size of 10 to 150 μm, but the coating property of the compound is not satisfactory. JP-A No. 33260/1992 discloses a method of using $LiCoO_2$ having an average grain size of not more than 0.5 μm. The coating property of the compound is satisfactory, but the self-discharge characteristics and charge/discharge cycle characteristics are inferior. Further, JP-A No. 94822/1993 discloses $Li_{1.03}Co_{0.92}Sn_{0.02}O_2$ having a specific grain size distribution, but the self-discharge characteristics, the charge/discharge cycle characteristics, and the coating property are not completely satisfactory.

SUMMARY OF THE INVENTION

An object of the present invention is to provide a nonaqueous secondary battery having a high discharge potential, a high discharge capacity, excellent cycle life of repeating charge and discharge (cycle characteristics), a minimized change of the discharge capacity of the battery between different lots, and increased safety.

Other and further objects, features, and advantages of the invention will appear more evident from the following description taken in connection with the accompanying drawing.

BRIEF DESCRIPTION OF THE DRAWING

In FIGURE 1, the thickness of the positive electrode or the negative electrode is illustrated larger by three times for exploration. Accordingly, the number of roll is reduced to one third. On the other hand, the body of the battery (the part corresponding to the length of the negative electrode case) is illustrated shorter by half.

DETAILED DESCRIPTION OF THE INVENTION

The above object of the present invention is accomplished by (1) a nonaqueous secondary battery comprising a positive-electrode-active material, a negative-electrode-active material, and a nonaqueous electrolyte comprising a lithium salt, wherein at least one of the negative-electrode-active material is an oxide comprising at least one of elements selected from In, Zn, Mg, and semimetals of the group IVB or VB of the periodic table, which is capable of intercalating and deintercalating lithium, and the positive-electrode-active material is represented by general formula A:

general formula A $Li_xCo_{y1}M_{y2}O_z$ wherein M represents an element selected from among Ni, V, Fe, Mn, Ti, and Cu; y1 represents a number of from 0.75 to 1.0, and y2 represents a number of from 0 to 0.25, with the proviso that a total of y1 and y2 is 1; x represents a number of from 0.7 to 1.20; and z represents a number of from 1.5 to 3.0, and wherein an average grain size (D) of the positive-electrode-active material is in a range of the formula:

$3 < D \leq 9.0$ μm, and wherein a volume that is occupied by grains of the positive-electrode-active material having a grain size of from 3 to 150 μm is not less than 75% of the total volume.

(2) a nonaqueous secondary battery comprising a positive electrode, a negative electrode, and a nonaqueous electrolyte, wherein at least one of negative-electrode-active materials of the negative electrode is an oxide comprising at least one of elements selected from In, Zn, and elements of the group IVB or VB of the periodic table, which is capable of intercalating and deintercalating lithium, wherein the positive electrode and the negative electrode are set up in a swirl form with a separator between them, and wherein the width of the negative electrode is wider by a range of from 0.2 mm to 5 mm than that of the positive electrode.

(3) a nonaqueous secondary battery comprising a positive electrode, a negative electrode of a transition metal oxide, and a nonaqueous electrolyte, wherein at least one of negative-electrode-active materials of the negative electrode is an oxide comprising at least one of elements selected from In, Zn, and elements of the group IVB or VB of the periodic table, which is capable of intercalating and deintercalating lithium, wherein the positive electrode and the negative electrode are set up in a swirl form with a separator between them, and wherein the separator is a porous polyolefin-base membrane having a porosity of from 35% to 40% and a maximum pore size of from 0.05 μm to 0.15 μm.

(4) the nonaqueous secondary battery as described in (3), wherein the separator is a laminate of two sheets of the porous polyolefin-base membrane having the porosity of from 35% to 40% and the maximum pore size of from 0.05 μm to 0.15 μm.

(5) a nonaqueous secondary battery comprising a positive electrode, a negative electrode of a transition metal oxide, and a nonaqueous electrolyte, wherein at least one of negative-electrode-active materials of the negative electrode is an oxide comprising at least one of elements selected from In, Zn, and elements of the group IVB or VB of the periodic table, which is capable of intercalating and deintercalating lithium, wherein the positive electrode and the negative electrode are set up with a separator between them in a swirl form, and wherein the length of burr in the thickness direction of the electrode on a cross section of the positive electrode and/or the negative electrode is in the range of from 0% to 50% of the thickness of the electrode.

Figure 1:
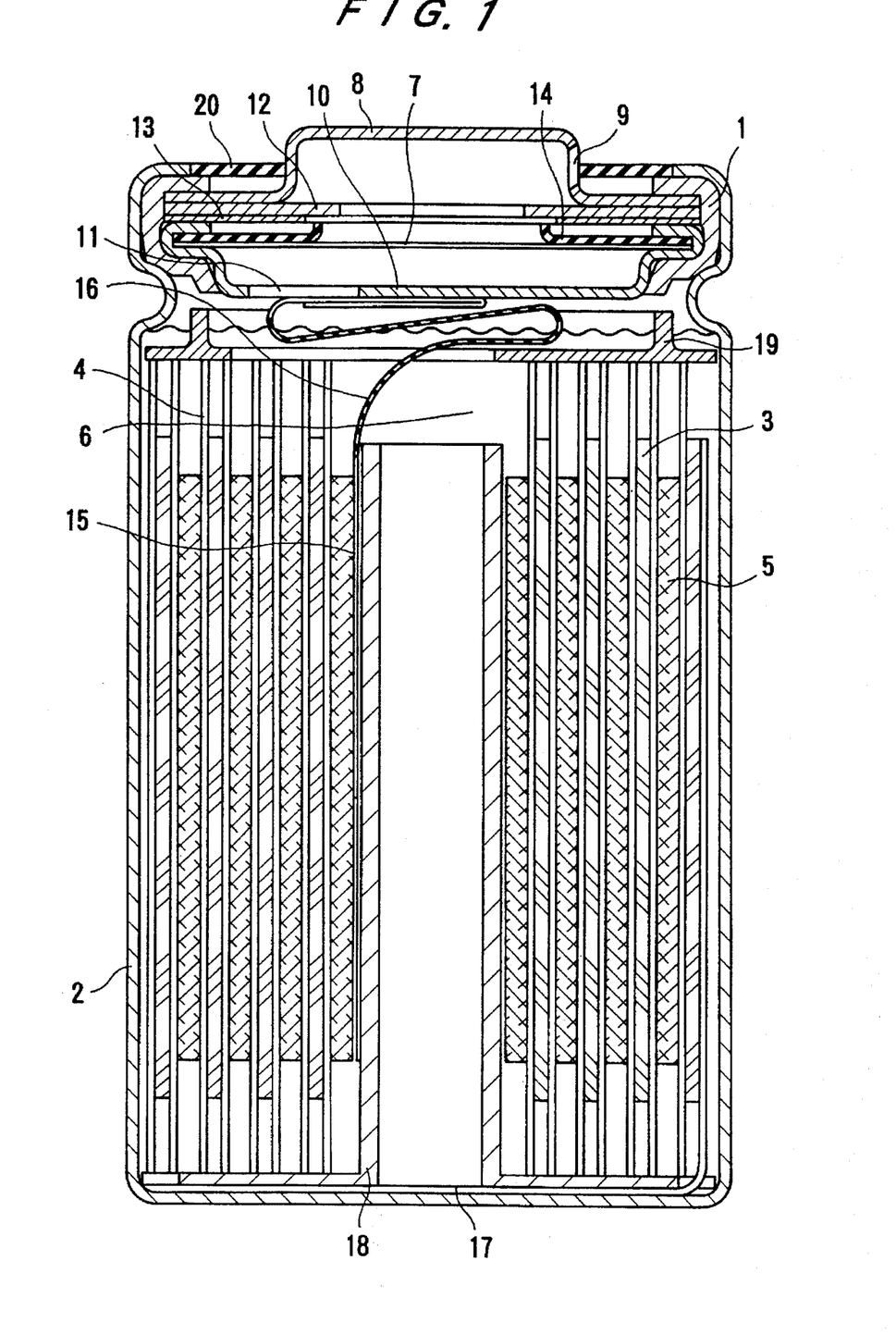
FIGURE 1 is a cross-sectional view of an example of the battery of the present invention.

An embodiment of the present invention is described in detail with reference to the accompanying drawing.

FIGURE 1 is a cross-sectional view of an embodiment of the nonaqueous secondary battery of the present invention.

The battery shown in FIGURE 1 is comprised a negative electrode (3) having layers containing a negative-electorode-active material, a positive electrode (5) having layers containing a positive-electrode-active material, and separator (4) between them, which are laminated and spirally rolled up. As a roll core, a spiral winding's core of an insulating material (18) integrally composed of the spiral winding's core and a bottom insulating plate, is used.

The roll is put in a cylindrical open-top battery case (2), made of nickel-plated iron, which also serves as a negative electrode terminal, and an electrolyte (6) containing a lithium salt is poured into the case (2). Battery cover (positive electrode cap) (8), which also serves as a positive electrode terminal, is caulked into the top of the case via an insulating gasket (1) made of synthetic resins (polypropylene). The positive electrode terminal (8) and the positive electrode sheet (5) are connected through a lead terminal of a positive electrode lead (15, 16). The positive electrode lead (16) is a part of the positive electrode lead (15), adhered with an insulating (friction) tape. The battery case (2) and the negative electrode sheet (3) are connected through a lead terminal of a negative electrode lead (17). A sealing plate (10), having a hole (11) for a safety valve (7), together with a ring-shaped PTC element (12), a ring (13), and an insulating ring (14), are set between the gasket (1) and the battery cover (8). An upper insulating plate (19) is put on the said roll in the case. The battery cover (8) has an exhaust port (9) for the safety valve. Further, an insulating plate (20) is set around the battery cover (8).

The term "semimetals of the group IVB and/or VB of the periodic table," as referred to in the present invention, means Ge, Sn, Pb, Sb, and Bi.

The terminology "precursors of the negative- electrode-active material," as referred to in the present invention, is explained below. The inventors have found that SnO having an α-PbO structure, $SnO_2$ having a rutile structure, and the like, do not act by themselves as a negative-electrode-active material of a secondary battery; rather they change their crystal structure due to intercalation of lithium, to then act as a reversible negative-electrode-active material of the secondary battery. That is, the charge and discharge efficiency of the first cycle is as low as about 80% or 60%. Therefore, the starting material, such as α-PbO-structure SnO and rutile-structure $SnO_2$; namely, a compound before lithium intercalation is called "a precursor of the negative-electrode-active material."

Specific examples of the negative-electrode-active material or the precursor thereof according to the present invention are GeO, $GeO_2$, SnO, $SnO_2$, PbO, $PbO_2$, $Pb_2O_3$, $Pb_3O_4$, $Sb_2O_3$, $Sb_2O_4$, $Sb_2O_5$, $Bi_2O_3$, $Bi_2O_4$, $Bi_2O_5$, and non-stoichiometrical compounds of these oxides.

Preferable among them are SnO, $SnO_2$, GeO, and $GeO_2$, with SnO and $SnO_2$ being particularly preferable. α-PbO-structure SnO, rutile-structure $SnO_2$, GeO, and rutile-structure $GeO_2$ are preferable, with α-PbO-structure SnO and rutile-structure $SnO_2$ being particularly preferable.

A variety of compounds can be incorporated into the precursor of the negative-electrode-active material according to the present invention. Examples thereof are compounds of the transition metals (elements that belong to the groups from IIIA to IVB of the 4th, 5th, and 6th periods of the periodic table), elements of the group IIIB of the periodic table, alkali metals (elements of the groups IA and IIA of the periodic table), and P, Cl, Br, I, and F. Further, $SnO_2$, for example, may also contain dopants of various compounds (e.g., compounds of Sb, In, Nb), for improving electrical conductivity, or Si as a homologous series element. The addition amount thereof is preferably from 0 to 20 mol %.

A precursor of the negative-electrode-active material can be prepared by the following method. $SnO_2$ can be prepared by mixing an aqueous solution of an Sn compound, such as stannic chloride, stannic bromide, stannic sulfate, and stannic nitrate, with an aqueous solution of an alkali hydroxide, such as lithium hydroxide, sodium hydroxide, potassium hydroxide, calcium hydroxide, magnesium hydroxide, and ammonium hydroxide, to precipitate stannic hydroxide, followed by washing, separation, and then subjection to calcination, wherein the thus obtained stannic hydroxide is almost dried and then calcined in air, a gas containing a large amount of oxygen, or a gas containing a small amount of oxygen, at 250° to 2,000° C. Alternatively, an unwashed stannic hydroxide may be calcined and then washed. The average grain size of the primary grains of $SnO_2$, when measured by a scanning-type electron microscope, is preferably 0.01 µm to 1 µm, particularly preferably 0.02 µm to 0.2 µm. The average grain size of the secondary grains of $SnO_2$ is preferably 0.1 µm to 60 µm. Similarly, SnO can be prepared by mixing an aqueous solution of stannous chloride, stannous bromide, stannous sulfate, or stannous nitrate, with an aqueous solution of an alkali hydroxide, such as lithium hydroxide, sodium hydroxide, potassium hydroxide, calcium hydroxide, magnesium hydroxide, and ammonium hydroxide, and then boiling the mixture. Alternatively, SnO can be prepared by calcining stannous oxalate in a gas containing a small amount of oxygen, at 250° to 1,000° C. The average grain size of SnO is preferably 0.1 µm to 60 µm.

Other oxides can be synthesized by a well-known method, as well as $SnO_2$ and SnO. The preferable physical properties of the other oxides are the same as those of SnO. The calcined product can be ground to a desired grain size by means of well-known grinding machines or classifiers, such as a mortar, a ball mill, a vibration ball mill, a satellite ball mill, a planetary ball mill, a printing air flow-type jet mill, and a sieve.

The positive-electrode-active material that is used in the present invention is represented by general formula A.

general formula A

The general formula A is explained in detail below. M represents an element selected from Ni, V, Fe, Mn, Ti, and Cu. Preferable among them are Ni, V, and Mn, with V being particularly preferable.

y1 represents a number of from 0.75 to 1.0, preferably from 0.8 to 1.0, and particularly preferably from 0.85 to 1.0. y2 represents a number of from 0 to 0.25, preferably from 0 to 0.2, and particularly preferably from 0 to 0.15, with the proviso that the total of y1 and y2 is 1.

x varies with charge and discharge, and represents a number of from 0.7 to 1.20 as a value at the calcination, preferably from 0.8 to 1.10, and particularly preferably from 0.95 to 1.0.

z varies with the values of y1 and y2 and a valance of M, and represents a number of preferably from 1.5 to 3.0.

Preferable examples of the compound represented by general formula A are $LiCoO_2$, $Li_{0.97}CoO_z$, $LiCo_{0.9}Ni_{0.1}O_z$, $LiCo_{0.95}V_{0.05}O_z$, $LiCo_{0.98}V_{0.02}O_z$, $LiCo_{0.75}Fe_{0.25}O_z$, $LiCo_{0.75}Mn_{0.25}O_z$, $LiCo_{0.85}Mn_{0.15}O_z$, $LiCo_{0.95}Mn_{0.05}O_z$, $Li_{1.02}Co_{0.97}Mn_{0.03}O_z$, $LiCo_{0.97}Ti_{0.03}O_z$, and $Li_{0.97}Cu_{0.03}O_z$, wherein z represents a number of from 1.7 to 2.3, but possible examples are not limited to these compounds.

The positive-electrode-active material can be synthesized by mixing a lithium compound and a transition metal compound, followed by calcination or by reacting these materials in a solution. The former calcination method is particularly preferable.

A calcination temperature applied to the present invention is selected from the range in which at least a part of the mixed compounds used in the present invention may be decomposed or melted, e.g., preferably from 250° to 2,000° C., and particularly preferably from 350° to 1,500° C.

The calcination atmosphere is not particularly limited, but air or a gas having a high oxygen content (e.g., not less than about 30%) is preferable for the positive-electrode-active material; and air or a gas having a low oxygen content (e.g., not more than about 10%), or an inert gas (nitrogen and argon), is preferable for the negative-electrode-active material.

Preferably the average grain size (D) of the positive-electrode-active material used in the present invention exceeds 3 μm, but does not exceed 9.0 μm, and the volume of the material that is occupied by grains having a grain size of from 3 μm to 15 μm, is 75% or more of the total volume. It is more preferable that the average grain size D exceeds 3.5 μm but does not exceed 8.5 μm, and the volume of the material that is occupied by grains having a grain size of from 3 μm to 15 μm, is 80% or more of the total volume. Most preferably the average grain size D exceeds 4.0 μm but does not exceed 8.0 μm, and the volume of the materail that is occupied by grains having a grain size of from 3 μm to 15 μm, is 85% or more of the total volume. The term "average grain sizer" as referred to herein, means a median size, and it can be measured by a laser diffraction-type grain size distribution meter.

Further, preferably the volume that is occupied by grains of the positive-electrode-active material represented by general formula A and having a grain size of 3 μm or smaller, is 18% or less, based on the total volume, and the volume that is occupied by grains having a grain size of from 15 μm to 25 μm, is 13% or less, based on the total volume. It is more preferable that the volume that is occupied by grains having a grain size of 3 μm or smaller, is 17% or less, based on the total volume, and the volume that is occupied by grains having a grain size of from 15 μm to 25 μm, is 7% or less, based on the total volume. Most preferably the volume that is occupied by grains having a grain size of 3 μm or smaller, is 16% or less, based on the total volume, and the volume that is occupied by grains having a grain size of from 15 μm to 25 μm, is 2% or less, based on the total volume.

Further, as the volume accumulation distribution, preferably D (25%)=3 to 7 μm, D (50%)=4 to 9 μm, D (75%)=5 to 12 μm, and D (90%)=6 to 13 μm; more preferably D (25%)=3 to 5 μm, D (50%)=4 to 7 μm, D (75%)=5 to 8 μm, and D (90%)=6 to 9 μm; and most preferably D (25%)=3 to 5 μm, D (50%)=4 to 6 μm, D (75%)=5 to 7 μm, and D (90%)=6 to 9 μm.

Furthermore, the positive-electrode-active material represented by general formula A according to the present invention desirably has substantially no grain size distribution in the range of 1 μm or smaller or 25 μm or larger. The term "have substantially no grain size distribution," as referred to herein, means that the volume percentage of grains of 1 μm or smaller or 25 μm or larger, is 3% or less, preferably 2% or less, and most preferably 0%.

The surface area per weight of the positive-electrode-active material represented by general formula A is preferably from 0.1 $m^2/g$ to 20 $m^2/g$, more preferably from 0.1 $m^2/g$ to 5 $m^2/g$, and most preferably from 0.2 $m^2/g$ to 1 $m^2/g$. The measurement is carried out according to the BET method.

When the positive-electrode-active material represented by general formula A according to the present invention is prepared by calcination, the calcination temperature is preferably from 500° to 1,500° C., more preferably from 700° to 1,200° C., and most preferably from 750° to 1,000° C. The calcination time is preferably from 4 to 30 hours, more preferably from 6 to 20 hours, and most preferably from 6 to 15 hours.

Specific examples, which are not meant to exclude others, of raw materials to be calcined for the positive-electrode-active material represented by general formula A, are CoO, $Co_2O_3$, $Co_3O_4$, cobalt carbonate, basic cobalt carbonate, cobalt hydroxide, cobalt sulfate, cobalt nitrate, cobalt oxalate, cobalt acetate, nickel oxide, nickel hydroxide, nickel carbonate, basic nickel carbonate, nickel nitrate, nickel sulfate, titanium oxide, lithium titanate, VO, $V_2O_3$, $V_2O_5$, vanadium hydroxide, ammonium metavanadate, $MnO_2$, $Mn_2O_3$, manganese hydroxide, manganese carbonate, manganese nitrate, manganese sulfate, manganese borate, manganese acetate, iron oxide (II valence and III valence), triron tetroxide, iron hydroxide (II valence and III valence), iron sulfate (II valence and III valence), iron nitrate (II valence and III valence), copper hydroxide, copper sulfate, copper acetate, copper oxide (I valence and II valence), lithium hydroxide, lithium oxide, lithium carbonate, lithium acetate, lithium nitrate, and lithium tartrate.

After calcination, a washing may be carried out. Preferably none of $CO_3O_4$, lithium carbonate, and the like are found in the calcined positive-electrode-active material of general formula A. Purity of the material represented by general formula A is preferably 99% or higher, more preferably 99.9% or higher, and most preferably 99.99% or higher.

The calcined product can be ground to a desired grain size by means of well-known grinding machines or classifiers, such as a mortar, a ball mill, a vibration ball mill, a satellite ball mill, a planetary ball mill, a spinning air flow-type jet mill, and a sieve.

A negative-electrode-active material to be used in the present invention can be synthesized by chemically intercalating lithium into a precursor thereof. For example, the intercalation lithium is preferably achieved by reacting metallic lithium, a lithium alloy, or butyl lithium with the precursor, or by electrochemically intercalating lithium into the precursor. It is particularly preferable to electrochemically intercalate lithium into an oxide as the precursor in the present invention. The electrochemical intercalation of a lithium ion is achieved by discharging the oxidation-reduction system (for example, an open system (electrolysis) or a closed system (battery)), which is composed of an objective oxide (referred to as a precursor of the negative-electrode-active material in the present invention) as a positive-electrode-active material, a metallic lithium as a negative-electrode-active material, and a nonaqueous electrolyte containing a lithium salt. Additionally, as another embodiment, the electrochemical intercalation of a lithium ion is preferably carried out by discharging the oxidation-reduction system (for example, an open system (electrolysis) or a closed system (battery)), which is composed of a lithium-containing transition metal oxide as a positive-electrode-active material, a precursor of the negative-electrode-active material as a negative-electrode-active material, and a lithium salt-containing nonaqueous electrolyte.

When lithium is electrochemically intercalated, it is preferable to send an electric current of 0.04 A to 1 A, per 1 g of the oxide as a precursor. It was found that, when the intercalation of lithium was conducted by sending a lower electric current, the thus obtained compound, surprisingly, showed low reversibility. The electric current is preferably sent at the initial stage of the first cycle, particularly preferably from the beginning to about 30% of the requisite capacity of the first cycle. It is preferable to continue sending the same or higher than the amount of the electric current at which Li-Al (80–20 wt %), as an example, may show about 0.6 V or less. After that, either high or low electric current can be applied. Further, it is preferable to send an electric current of 0.06 A to 0.8 A, based on 1 g of the oxide as a precursor.

The amount of intercalation of lithium is not particularly limited, but it is preferable to intercalate lithium, so that Li-Al (80–20 wt %), as an example, may show 0.05 V, more preferably 0.1 V, and most preferably 0.15 V.

The equivalency of lithium intercalation at this time amounts to 3 to 10 equivalents, and the ratio of a positive-electrode-active material to a negative-electrode-active material is decided according to the above-mentioned equivalent amount. It is preferable to use a positive-electrode-active material in an amount based on the calculated ratio multiplied by 0.5 to 2. Where any other substance besides a positive-electrode-active material, e.g., metallic lithium, a lithium alloy, or butyl lithium, is used as a lithium source, the amount of a positive-electrode-active material to be used is decided in conformity with the equivalent amount of deintercalated lithium of the negative-electrode-active material. In this case, too, the ratio based on the equivalent amount is preferably multiplied by 0.5 to 2.

The ratio of a positive-electrode capacity to a negative-electrode capacity (hereinafter abbreviated as C/A ratio, which is defined by the following formula:

$$C/A \text{ ratio} = \frac{\text{(Positive-electrode capacity } mAH\text{)}}{\text{(Negative-electrode capacity } mAH\text{)}}$$

is in a range of preferably 0.5 to 5, more preferably 1 to 4, and most preferably 1.5 to 3.5.

When oxides according to the present invention were used as a precursor of the negative-electrode-active material, it was found that intercalation of lithium does not cause reduction of the respective metal (an alloy with lithium). This can be inferred from the following:

(1) observation under a transmission electron microscope revealed no precipitation of a metal (especially no precipitation of a dendrite), (2) the electric potential of lithium intercalation/deintercalation via a metal was different from that of the oxide, and (3) the lithium deintercalation loss with respect to lithium intercalation in SnO was about 1 equivalent, which did not agree with a loss of 2 equivalents when metallic tin was generated.

Since the electric potential of an oxide is similar to that of a currently employed calcined carbonaceous compound, it is assumed that the bonding state of lithium is neither mere ionic bonding nor metallic bonding, as is the case with a calcined carbonaceous compound. Accordingly, it can be concluded that the present invention is apparently different from a conventional lithium alloy.

The oxide (a precursor) according to the present invention has a crystal structure, but intercalation of lithium reduces its crystallinity, and it changes from a crystal structure to an amorphous structure. Accordingly, the structure of a compound that reversibly oxidizes and reduces as a negative-electrode-active material is assumed to be highly amorphous. As a result, the oxide (a precursor) according to the present invention may have a crystal structure, an amorphous structure, or a mixed structure thereof.

Negative-electrode-active materials that may be used in combination with the negative-electrode-active material of the present invention, include metallic lithium, lithium alloys, Al-Mg, Al-Sn, Al-In, Al-Cd, and calcined carbonaceous compound capable of intercalating and deintercalating a lithium ion or metallic lithium.

The purpose of the combined use of the above-described metallic lithium or a lithium alloy is to intercalate lithium into an oxide within a cell, but not to utilize the dissolution-precipitation reaction of metallic lithium, etc., as an electrode reaction.

In a composite material (composition) for electrode, there can be added a conducting agent, a binder, a filler, etc.

The conducting agent may be any electron-conducting material that undergoes no chemical change in an assembled battery. Suitable conducting agents include natural graphite (flaky graphite, crystalline graphite, lumpy graphite, etc.), artificial graphite, carbon black, acetylene black, ketjen black, carbon fiber, metal powder (e.g., copper, nickel, aluminum, silver powder), metallic fibers, polyphenylene derivatives, and mixtures of two or more thereof. A combination of graphite and acetylene black is particularly preferable.

The amount of the conducting agent to be used is not particularly limited, but preferably it is from 1 to 50% by weight, most preferably from 2 to 30% by weight. Carbon or graphite is most preferably used, in an amount of from 2 to 15% by weight.

Where a precursor of the active material is made electron-conductible, as when Sb is doped with $SnO_2$, the amount of the above-described conducting agent can be reduced. For example, it is preferable to add the conducting agent in an amount of from 0 to 10% by weight.

As the binder, use can be made of polysaccharides, thermoplastic resins, and rubbery polymers, such as starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyvinylidene fluoride, polyethylene, polypropylene, ethylene-propylene-diene terpolymers (EPDM), suflonated EPDM, styrene-butadiene rubbers, polybutadiene, fluorine rubbers, polyethylene oxide, and mixtures of two or more thereof. In using a compound having a functional group reactive with lithium, such as a polysaccharide, it is preferable to deactivate the functional group by addition of, for example, a compound having an isocyanate group. The amount of the binder to be used is not particularly limited, but preferably it is from 1 to 50% by weight, most preferably from 2 to 30% by weight.

The filler to be used is not particularly limited, as long as it is a fibrous material that undergoes no chemical change in an assembled battery. As the filler, use can be made of fibers of polyolefines (e.g., polypropylene or polyethylene), glass fiber, and carbon fiber. Though not a limitation, the filler is preferably used in an amount of up to 30% by weight.

The nonaqueous electrolyte contains at least one organic solvent and at least one lithium salt soluble in the solvent. Suitable organic solvents include aprotic organic solvents, such as propylene carbonate, ethylene carbonate, butylene carbonate, dimethyl carbonate, diethyl carbonate, γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, methyl propionate, ethyl propionate, phosphoric triesters, trimethoxymethane, dioxolane derivatives, sulfolane, 3-methyl-2-oxazolidinone, propylene carbonate derivatives, tetrahydrofuran derivatives, diethyl ether, and 1,3-propanesultone. These solvents may be used either individually or in combinations of two or more. As the lithium salts soluble in these solvents, use can be made of $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, lower aliphatic lithium carboxylates, $LiAlCl_4$, LiCl, LiBr, LiI, chlorobora lithium, and lithium tetraphenylborate. These lithium salts may be used either individually or in combinations of two or more. Preferable electrolytes are electrolyte solutions of $LiCF_3SO_3$, $LiClO_4$, $LiBF_4$, and/or $LiPF_6$, in a mixed solvent of propylene carbonate or ethylene carbonate and 1,2-dimethoxyethane and/or diethyl carbonate, with an electrolyte containing at least ethylene carbonate and $LiPF_6$ being particularly preferable.

The amount of the electrolytic solution to be used in a battery is not particularly limited and can be properly selected according to the amounts of the positive- and negative-electrode-active materials or the size of the battery.

While not limited, the volume ratio of solvents is preferably from 0.4/0.6 to 0.6/0.4 in a mixed solution of (propylene carbonate or ethylene carbonate or butylene carbonate) and (1,2-dimethoxy ethane and/or diethyl carbonate), wherein the volume ratio of ethylene carbonate and butylene carbonate to be used in combination is from 0.4/0.6 to 0.6/0.4, and the volume ratio of 1,2-dimethoxy ethane and diethyl carbonate to be used in combination is from 0.4/0.6 to 0.6/0.4.

While not limited, the concentration of the supporting electrolyte is preferably from 0.2 to 3 mols per liter of the electrolytic solution.

In addition to electrolytic solutions, the following solid electrolytes may also be employed. The solid electrolytes can be classified into an inorganic solid electrolyte and an organic solid electrolyte.

Suitable inorganic solid electrolytes, are the well known lithium nitrides, lithium halides, lithium oxyacid salts, etc. Effective among them are $Li_3N$, LiI, $Li_5NI_2$, $Li_3N$-LiI-LiOH, $LiSiO_4$, $LiSiO_4$-LiI-LiOH, $xLi_3PO_4$-$(1-x)Li_4SiO_4$, $Li_2SiS_3$, phosphorus sulfide compounds, etc.

Examples of effective organic solid electrolytes include polyethylene oxide derivatives or polymers containing the same, polypropylene oxide derivatives or polymers containing the same, polymers containing an ionizing group, a mixture of a polymer containing an ionizing group and the above-described aprotic electrolytic solution, and phosphoric ester polymers.

Moreover, polyacrylonitrile can be added to an electrolytic solution. Further, a combination of an inorganic solid electrolyte and an organic solid electrolyte is also known.

As a separator, an insulating thin film having high ion permeability and prescribed mechanical strength is used. The separator is made of an olefin-series polymer, e.g., polypropylene, polyethylene, glass fiber, polyethylene, alumina fiber, a fluorine-containing polymer, a cellulose-series polymer, polyimide, nylon, and the like. Preferable among them are polypropylene and polyethylene, for their organic solvent resistance and hydrophobic properties, with polypropylene being most preferable. Examples of suitable shape of the separator to be used include a microporous sheet, a nonwoven fabric, and a fabric. The microporous sheet is most preferable among them. The porosity of the microporous separator (values decided by ASTM D2873) is preferably from 35% to 40%, more preferably from 37% to 39%. The pore size of the above-described porous separator, observed through SEM, is preferably maximum pore sizes of from 0.05 µm to 0.15 µm, for the major axis, and from 0.01 µm to 0.07 µm, for the minor axis, and more preferably maximum pore sizes of from 0.1 µm to 0.14 µm, for the major axis, and from 0.03 µm to 0.06 µm, for the minor axis. Further, the thickness of the separator is preferably about 25 µm, i.e., from 20 µm to 30 µm. With respect to other physical properties, preferably the air permeability resistance (values decided by ASTM D-726) is from 25 to 60 sec/10 ml; a coefficient of contraction (values decided by ASTM D-1204 at 90° C. for 60 minutes) is less than 5%; and the tensile strength (values decided by ASTM D-882) is about 1055 $kg/cm^2$, for the MD value, and about 84 $kg/cm^2$, for the TD value. Moreover, when a laminate made of multiple separators is used, effects of the present invention are remarkably increased. Most preferably the number of the separators to be laminated is 2. The separator may be optionally subjected to a glow discharge treatment, a corona discharge treatment, a plasma discharge treatment, and the like. An ion-conducting film of PEO may be optionally provided on the separator. Further, the separator may optionally contain a surface-active agent.

For the purpose of improving a variety of characteristics for the battery, such as cyclic characteristics, an over-discharge suitability, and an over-charge suitability, the following ingredients may be optionally added to at least one kind of electrolytic solutions or electrodes in a battery: phosphoric acid or phosphates, polyphosphoric acid or polyphosphates, metaphosphoric acid or metaphosphates, polysilicic acid or polysilicates, calcium salts, lead salts, aluminum salts, chromic acid or chromates, nitric acid or nitrates, molybdic acid or molybdates, vanadic acid or vanadates, ferrocyanates, pertechnetic acid or pertechnetates, cyanates, acetylene, propargyl alcohol, hydroxyhexyne, methylhydroxy pentyne, alkylamines, alkenyl amines, alkylammonium salts, cyclohexylamine, aniline, aniline derivatives, benzonitrile, homopiperazine, 2-hydroxy-3-(2-alkylamidoethylamino)propane-1-triethylammonium hydroxide, alkylmercaptanes, dialkylsulfides, thioglycollic acid, L-cysteine, L-methionine, thiourea, thiourea derivatives, cyanoguanidine-formaldehyde condensation polymer, dibenzylsulfoxide, alkylxantate, acrylamide, aromatic aldehyde, diaminobenzoic acid, furan, furan derivatives, pyrrole derivatives, thiophene derivatives, pyridine derivatives, quinoline derivatives, acridine, methoxyphenyl sulfopyridinium chloride, indole, thymine, mercaptobenzimidazole, benzothiazole, mercaptobenzoxazole, benzotriazol or its derivatives, purine, triphenyltetrazolium chloride, urotropin, diphenylphenanthroline, tetrabutylphosphonium, alkylamines, enamine, hydrazine derivatives, halogenoacetic acid, monosaccharide, cupferron, quinoline derivatives, pyridine derivatives, nitrosonaphthol, tetraphenylphosphonium bromide, benzenearsonic acid, dodecylmercaptane, piperazine, trazole, ethylenediamine, polyamines, aminoethanol, triethanolamine derivatives, cysteine, gluconates, biguanide, phosphonic acids, morpholines, aminobenzaldehyde, cupferron, pyridine, imidazolines, benzimidazoles, benzylammonium N-benzylcarbamate, salicylaldoxime, phenol derivatives, gelatin, etc.

In order to make the electrolytic solution incombustible, a halogen-containing solvent, such as carbon tetrachloride or trifluorochloroethylene, may be added to the electrolytic solution (JP-A No. 36632/1973). Furthermore, in order to make the electrolytic solution resistant to high-temperature preservation, carbonic acid gas may be incorporated thereto (JP-A No. 134567/1984).

The composite materials for positive and negative electrodes may contain an electrolytic solution or an electrolyte. For example, it is known to add the above-described ionic conductive polymer or nitromethane (JP-A No. 36633/1973) or electrolytic solution (JP-A No. 124870/1982) to the mixture.

The surface of the positive-electrode-active material may be modified. For example, the surface of the metal oxide may be modified with an esterification agent (JP-A No. 163779/1980), a chelating agent (JP-A No. 163780/1980), a conducting high-molecule compound (JP-A No. 163188/1983 and JP-A No. 14274/1984), polyethylene oxide (JP-A No. 97561/1985), and the like.

The surface of the negative-electrode-active material may also be modified by, for example, providing a layer comprising an ion-conductive polymer or polyacetylene (JP-A No. 111276/1983), or by treatment with LiCl (JP-A No. 142771/1983).

A collector for an electrode-active material may be made of any electron-conducting substance that undergoes no chemical change in an assembled battery. Examples of suitable materials of a collector for the positive electrode include stainless steel, nickel, aluminum, titanium, calcined carbon; and aluminum or stainless steel whose surface is treated with carbon, nickel, titanium, or silver. Examples of suitable material of a collector for the negative electrode include stainless steel, nickel, copper, titanium, aluminum, calcined carbon; copper or stainless steel whose surface is treated with carbon, nickel, titanium, or silver; and an Al-Cd alloy. These materials may be subjected to surface oxidation. The collector may have a variety of forms, such as a foil, a film, a sheet, a net, a punched sheet, a lath, a porous body, a foamed body, a fibrous body, and so on. While not limited, the thickness of the collector is from 1 to 500 μm.

Each positive and negative electrode can be obtained by coating a composition for electrode containing the positive- or negative-electrode-active material, for example, a slurry of the composition, onto the collector (support) for the positive- or negative-electrode-active material, preferably onto the both surfaces of the collector.

In coating the composite material for electrode, it can be coated by a conventional method, such as a reverse roll coating, a direct roll coating, a blade coating, a knife coating, an extrusion coating, a slide hopper coating, a curtain coating, a gravure coating, a bar coating, a dip coating, and a squeeze coating. Preferable among them are the blade coating, the knife coating, and the extrusion coating. The coating can be carried out at the transportation speed of the support ranging from 0.1 m/min. to 100 m/min. An excellent state of the coating surface can be attained by selecting a suitable one from the above-described coating methods according to physical properties and drying ability of the composite material for electrode. The coating can also be carried out at a tension (weight per 1 $mm^2$) ranging from 0.1 kg weight to 100 kg weight, depending on mechanical strength, flapping, curl, and so on of the support. When the support is aluminum, the tension is preferably from 1 to 20 kg weight per 1 $mm^2$, most preferably from 2.5 to 10 kg weight per 1 $mm^2$. When the support is copper, nickel, or stainless steel, the tension is preferably from 2 to 50 kg weight per 1 $mm^2$, most preferably from 2.5 to 25 kg weight per 1 $mm^2$. The thickness, length, and width of the coating layer can be decided depending on the size of the battery. In particular, the dry thickness (thickness after compression) is preferably selected from the range of 1 to 2000 μm.

When a solvent remains in composite material for electrode, the thus sheet-like coated electrode is optionally subjected to a drying process, in order to remove the solvent. The drying can be performed by any of conventional methods. Particularly preferable among them are hot air, a vacuum, infrared rays, far-infrared rays, a microwave, low-humidity (dry) air, and dielectric super-heating, or a combination thereof. The drying temperature is preferably from 20° C. to 350° C., more preferably from 40° C. to 200° C. When air is used, the air speed is preferably from 0.1 to 100 m per second, more preferably from 1 to 30 m per second. The drying process is carried out at a tension ranging from 0.1 to 100 kg weight per 1 $mm^2$, depending on the mechanical strength, the flapping, and the curl of the support. When the support is aluminum, the tension is preferably from 1 to 20 kg weight per 1 $mm^2$, most preferably from 2.5 to 10 kg weight per 1 $mm^2$. When the support is copper, nickel, or stainless steel, the tension is preferably from 2 to 50 kg weight per 1 $mm^2$, most preferably from 2.5 to 25 kg weight per 1 $mm^2$.

The electrode sheets cut to a desired shape are used. With respect to the relationship in width between the positive electrode and the negative electrode to be cut, the negative electrode should be wider than the positive electrode, with a difference of preferably from 0.2 mm to 5 mm, more preferably from 0.5 mm to 4 mm. The cutting methods to be used are a conventional shear method, a precision punch method, a shear method with no burr, a flat press method, a vertical punch method, a punch method with burr put aside, etc. Most preferably a section (cutting plane) of the electrode sheet (positive electrode and/or negative electrode) is cut so that no burr (a general term of the projection generated on a material during a cutting) may be generated, while a slight generation of burr is permissible. In this case, the length of the burr, in the direction of the thickness of the electrode, is preferably from 0 to 50% of the thickness of the electrode, or it may be from 5 to 25% of the thickness of the electrode. The cutting is carried out at a tension of from 0.1 to 100 kg weight per 1 $mm^2$, which is suitably selected according to the mechanical strength, the flapping, and the curl of the support. When the support is aluminum, the tension is preferably from 1 to 20 kg weight per 1 $mm^2$ most preferably from 2.5 to 10 kg weight per 1 $mm^2$. When the support is copper, nickel, or stainless steel, the tension is preferably from 2 to 50 kg weight per 1 $mm^2$, most preferably from 2.5 to 25 kg weight per 1 $mm^2$.

When water remains in a composite material for electrode, the sheet-like electrode is optionally subjected to a dehydration process, in order to remove water. The dehydration can be performed by any of conventional methods. Particularly preferable among them are hot air, a vacuum, infrared rays, far-infrared rays, a microwave, low-humidity (dry) air, and dielectric super heating, or a combination thereof. The dry temperature is preferably from 20° C. to 350° C., more preferably from 100° C. to 250° C. Dehydration is carried out at a tension ranging from 0.1 to 100 kg weight per 1 $mm^2$ depending on the mechanical strength the flapping, and the curl of the support. When the support is aluminum, the tension is preferably from 1 to 20 kg weight per 1 $mm^2$, most preferably from 2.5 to 10 kg weight per 1 $mm^2$. When the support is copper, nickel, or stainless steel, the tension is preferably from 2 to 50 kg weight per 1 $mm^2$, most preferably from 2.5 to 25 kg weight per 1 $mm^2$. The percentage of water content (the amount of water remaining in a composite material for electrode) is preferably 2000 ppm or less, based on the whole content of the battery. The percentage of water content is preferably 500 ppm or less, more preferably 200 ppm or less, based on the composite material for electrode.

The negative electrode sheet can be optionally charged in the state of sheet. This is done by immersing the negative electrode sheet and lithium or a material capable of deintercalating lithium in an electrolytic solution, and then keeping the electrical potential of the said negative electrode sheet basic (ignoble), as compared to that of the said lithium or the said material capable of deintercalating lithium.

The electrode sheet may have a lead tab. As a material of the lead tab, use can be made of aluminum, nickel, titanium, stainless steel, or an alloy thereof, for the positive electrode sheet; and copper, nickel, titanium, stainless steel, or an alloy thereof, for the negative electrode sheet. Preferable among them are aluminum, for the positive electrode sheet, and nickel and copper, for the negative electrode sheet.

While the shape of the lead tab is generally ribbon-shaped, it is possible to conduct electricity from multiple points by having one side of the tab provided with a circular part that has almost the same diameter as the electrode body (as described later) (if necessary, large or small holes or a cut are provided therein, and a part that contacts the electrode body faces up), and then connecting the circular part with the top or bottom of the electrode body by welding or so on. In this case, it is necessary that one edge of the electrode support be positioned at the top, while the other edge is at the bottom. Further, when at least one edge of the electrode support is located on the top or bottom, it is also possible to conduct electricity by contacting a collector with at least one point or multiple points (when occasion demands) of the edge.

The set position of the lead tab is preferably the part that will become most inside at the rolling for the positive electrode sheet, and the part that will become most outside at the rolling for the negative electrode sheet. If necessary, two or more lead tabs may be set, leaving a suitable space. Examples of setting methods include a direct current resistance welding, an alternating current resistance welding, a pressure welding, a laser welding, and a ultrasonic welding.

A friction tape may be adhered (stuck) to the above-described load tab. With respect to the materials of the friction tape, a base material is selected from at least one of Aramide fiber, polyimide, a plain paper, captan, super-high-molecular-weight polyethylene, Teflon, polyester, rigid vinyl chloride, polyurethane, vinyl, a nonwoven fabric, a tracing paper, a paper, acrylfoam, urethane foam, elastomer foam, a crepe paper, polyolefin, polypropylene, polyethylene, glass cloth, and alumina cloth; and an adhesive is selected from at least one of silicone-type, acryl-type, epoxy- type, and gum-type adhesives. Preferable among them are a tape consisting of captan (the base material) and a silicone-type adhesive, a tape consisting of Aramide fiber (the base material) and a silicone-type adhesive, and a tape consisting of polyimide (the base material) and an acryl-type adhesive. The shape of the tape may be suitably selected. When the lead tab is ribbon-shaped, a tape slightly wider than the ribbon may be adhered to one side or both sides of the ribbon, or a tape of the same width as the ribbon may be adhered to one side or both sides of the ribbon. Alternatively, the ribbon may be wrapped with the tape. As a wrapping method, the ribbon may be wrapped with a tape whose width is twice or more that of the ribbon, or it may be spirally wrapped with a long strip tape.

A roll core may be used. As the materials of the roll core, use can be made of stainless steel (SUS 304, SUS 301, SUS 316, SUS 430, etc.), aluminum, titanium, nickel, copper, nickel-plated iron, or an alloy thereof; glass, alumina, ceramic, clay, plastics, Aramide fiber, polyimide, a paper, captan, super-high-molecular-weight polyethylene, Teflon (trade name), polyester, rigid vinyl chloride, polyurethane, polyvinyl resin, acryl foam, urethane foam, elastomer foam, a crepe paper, polyolefin, polypropylene, polyethylene, etc. The shape of the roll core to be used may be a hollow tube whose section is like the letter O, a hollow tube with a section part broken like the letter C, a stick, a porous material, or the like. Further, preferable shapes of the roll core are those whose both edges are chipped and roundish, or those whose outer diameter becomes narrower in the direction of from each vicinity of the edge to each edge. Furthermore, the roll core may be used at the beginning of rolling of the electrode, or it may be inserted after the rolling of the electrode, or it may be inserted after a battery body has been contained in a battery case.

The rolling of the electrode can be carried out according to that of the electrolytic condenser electrode, which rolling is known to one skilled in the art. The rolling is done with an inner electrode, an inner separator, an outer electrode, and an outer separator being piled up, in this order, so that the outer separator may be positioned in the outermost side of the roll. The outer electrode may be a negative electrode and the inner electrode may be a positive electrode, and vice versa. When the battery case serves as a negative terminal, preferably the outer electrode is a negative electrode and the inner electrode is a positive electrode. The outer separator and the inner separator may be connected together at the vicinity of the initial part of the roll, or they may be independent of each other. Alternatively, the outer separator and the inner separator may be connected together like an envelope at the peripheral region. At the beginning of the rolling, use can be made of a method of rotating a roll core while fixing a separator to the roll core, a method of rotating a roll core holding a separator therein (the roll core has a split so that the separator may be held therein), or a method of rotating a roll core while fixing a support of the positive or negative electrode to the roll core. Preferably the separator is pulled by a suitable power. The tensile tension of the separator is preferably from 100 g weight to 10 kg weight, more preferably from 200 g weight to 2 kg weight. The said tension may be controlled at a fixed rate, or it may be increased successively from the beginning to the end of the rolling, or it may be decreased successively from the beginning to the end of the rolling. The rotating speed of the rolling is preferably from 20 to 3000 rounds per minute, more preferably from 30 to 300 rounds per minute. The rotating speed may be controlled at a fixed rate during the rolling, or it may be increased successively from the beginning to the end of the rolling, or it may be decreased successively from the beginning to the end of the rolling.

An end tape may be adhered to the rolled electrode body (the roll of positive and negative electrodes and separator (s)). With respect to the materials of the end tape, examples of a base material to be used include Aramide fiber, polyimide, a plain paper, captan, super-high-molecular-weight polyethylene, Teflon, polyester, rigid vinyl chloride, polyurethane, polyvinyl resin, a nonwoven fabric, a tracing paper, a paper, acryl foam, urethane foam, elastomer foam, a crepe paper, polyolefin, polypropylene, polyethylene, glass cloth, and alumina cloth; and examples of adhesives to be used are silicone-type, acryl-type, epoxy-type, and gum-type adhesives. Preferable among them are a tape consisting of captan (the base material) and a silicone-type adhesive, a tape consisting of Aramide fiber (the base material) and a silicone-type adhesive, and a tape consisting of polyimide (the base material) and an acryl-type adhesive. Further, the end tape may be adhered to a part of the outside of the electrode body, or it may be adhered all around the outside of the electrode body, or it may be adhered almost all around the outside of the electrode body, except for the above-described lead tab of the negative electrode, when occasion demands. The width of the end tape may be shorter than, or the same as, the length of the electrode body.

The above-described electrode body is contained in a battery case or can. The materials of the battery case or can are, for example, nickel-plated iron, stainless steel (SUS 304, SUS 304L, SUS 304N, SUS 316, SUS 316L, SUS 430, SUS 444, etc.), nickel-plated stainless steel (ibid.), aluminum or aluminum alloy, nickel, copper, and titanium.

An insulating plate may be equipped between the electrode body and the bottom of the battery case or can, and/or between the electrode body and a lid of the battery case or can.

As the materials of the insulating plate, use can be made of Aramide fiber, polyimide, a plain paper, captan, super-high-molecular-weight polyethylene, Teflon, polyester, rigid vinyl chloride, polyurethane, polyvinyl resin, a nonwoven fabric, a tracing paper, a paper, acryl foam, urethane foam, elastomer foam, a crepe paper, polyolefin, polypropylene, polyethylene, nylon, glass cloth, and alumina cloth. The insulating plate may be porous, if necessary.

The insertion of an electrode body into a battery case (can) is, for example, carried out by a method for inserting thereto the electrode body on which an end tape has been stuck, or by a method for inserting thereto the electrode body from which the end tape has been stripped, or by a method for adjusting the thickness of a battery case (can) to the prescript size by pressing the battery case (can) at a suitable stage after the insertion of the electrode body, with the battery case (can), previously made, having an additional thickness of from 50 to 500 μm as compared to the prescript size thereof. When the insertion of the electrode body on which the end tape has been adhered is carried out, preferably at least a vicinity of the tip of the electrode body for the penetration is sufficiently covered with the end tape so that the shape of the tip may not be disarranged. Further, in the case that the lead tab is located near the outside of the electrode body, the penetration is easily carried out when the end tape is rolled with keeping away from the lead tab part, and the cross section of the electrode body approaches an exact circle. After the insertion of the electrode body, it is preferable to weld the lead tab, which is connected with a support of one of the electrodes, to the inside of the bottom of the battery case (can). Examples of the connecting methods include a direct current resistance welding, an alternating current resistance welding, a pressure welding, a laser welding, and a ultrasonic welding.

The battery case (can), containing its inserted electrode body, etc., may be made to easier support a lid and a gasket, by slenderizing, to some extent, a diameter of the vicinity of its opening part (this slenderized part is called a bead, and this operation is called beading).

The bead is made by pushing a rotating battery case (can) from the side direction with a discoidal roller. At this time, it is preferable to adequately push and support the end of the opening part of the battery case (can) from the inside direction. Further, the battery case (can) may be pushed at the top and the bottom thereof. Alternatively, the diameter of the vicinity of the opening part of the battery case (can) may be made thick in advance.

A sealing agent may be coated on the inside of the vicinity of the opening part of the battery case (can), and/or on the gasket, when occasion demands. As the materials of the sealing agent, preferable are a pitch, such as asphalt and coal tar, or a mixture thereof. Examples of the said mixture include a mineral oil, silicone gum, thermoplastic or thermohardening resin (vinyl acetate or atactic polypropylene), gum latex (a suspension wherein styrene butadiene gum, butadiene gum, chloroprene gum, or ethylene propylene gum, or a mixture thereof, is dispensed with a cationic surface-active agent in water), and non-silicone-type rubber (natural rubber (NR), isoprene rubber (IR), butadiene rubber (BR), 1,2-polybutadiene (1,2-BR), styrene-butadine rubber (SBR), chloroprene rubber (CR), nitryl rubber (NBR), butyl rubber (IIR), ethylene-propylene rubber (EPM, EPDM), chlorosulfonated polyethylene (CSM), and acryl rubber (ACM, ANM)).

As the above-said mixture, the non-silicone-type rubber is preferable among them. A mixture to which a clay mineral, such as a montmorillonite mineral, is further added is more preferable. A sealing agent is dissolved and mixed in a non-polar organic solvent, and then, if necessary, impurities are removed therefrom by a filtration or decantation (precipitation). The viscosity of the mixture is adequately adjusted, and then the mixture is coated on a base, followed by an evaporation of the organic solvent, whereby a coating layer (membrane) of the sealing agent is formed. Examples of the organic solvent include toluene, xylene, cyclohexane, hexane, chloroform, dichloroethane, dichloromethane, and a mixture thereof. The dissolving and the coating may be carried out by heating. Two methods may be used for coating of the coating agent. In one, the coating is carried out by rotating a battery case (can), or a gasket or a sealing (closing) plate. In the other method, the coating is carried out by circularly rotating a tip of the nozzle from which the sealing agent is extruded. The number of rotations is preferably from 1 to 6000 revolutions per minute, more preferably from 60 to 600 revolutions per minute. The axis of rotation may be vertical, or it may be inclined in the range of from 45 to 30 degrees. As the nozzle from which the sealing agent is extruded, use can be made of a nozzle with a valve, a nozzle whose section is rectangular, a nozzle whose section is circular, a nozzle whose tip is fan-shaped, and a nozzle whose tip has a curved surface. The vicinity of the tip of these nozzles may be subjected to a treatment with a repellent solution. These nozzles may be set up with declining those by the range of from 45 to 30 degrees. In order to send a sealing agent to the nozzle, use can be made of a method of pushing a liquid surface of the sealing agent with a pressure gas, natural falling due to gravity, a squeezing pump, a flange pump, a injector-type pump, a gear pump, a rotary pump, a mono pump, a capillary percolation, etc.

The volume of the gaseous phase remaining in the inner part of the battery is preferably from 0.1 to 30% of the capacity of the inner part, more preferably from 0.2 to 5%. The above-mentioned gaseous phase means a part that is filled with air, argon, a vapor from the electrolytic solution, etc., and it contains neither liquid nor solid.

The material of the gasket is generally a polyethylene resin, a polypropylene resin, or a nylon resin. The water permeability of the region (unit: cubic centimeter•centimeter per square centimeter•second•Pascal) is preferably 200 or less, more preferably 100 or less, most preferably 80 or less. As the polypropylene resin, use can be made of a homopolymer, a block copolymer, a random copolymer, etc., which may be strengthened by adding thereto a filler or the like. The copolymer may be prepared using an ethylene monomer or the like. When a mixture of polyethylene, polypropylene, and ethylene propylene gum is used, the crystallization degree may be adjusted to the range of from 50 to 70%, by adding thereto a crystal nucleating agent. Further, preferably the melt flow rate is from 0.5 to 50 (grams per 10 minutes); the tensile strength is from 150 to 800 (kg weight per square centimeter); the stretching rate is from 10 to 1000 (%); the modulus of bending elasticity is from 5,000 to 30,000 (kg weight per square centimeter); the Rockwell strength is from 50 to 200 (R scale); Vicat softening point is from 80 to 200 (centigrade temperature); the thermal transformation temperature is from 50 to 150 (centigrade temperature); the Izod impact strength is from 1 to 50 (kg weight·centimeter per square centimeter); the modulus of compression elasticity is from 2,000 to 18,000 (kg weight per square centimeter); and the compression strength is from 150 to 1200 (kg weight per square centimeter); the surface of the gasket may be subjected to a glow treatment, a plasma treatment, a corona treatment, etc. Further, the gasket may be heat-treated for a period time of 10 minutes to 100 hours, at a range of 50° to 200° C., before using.

The materials of the sealing plate and/or the cap are stainless steel (SUS 201, (hereinafter SUS is omitted) 202, 301, 301J1, 302, 302B, 404, 304L, 304N1, 304N, 2304LN, 305, 309S, 310S, 316, 316L, 316N, 316LN, 316J1, 316J1L, 317, 317L, 317L1, 321, 347, XM15J1, 329J1, 329J2L, 405, 410L, 429, 430, 430LX, 434, 436L, 444, 447J1, XM27, 403, 410, 410S, 420J1, 420J2, 429J1, 440A, 631), ammonium or its alloy (JIS name: IN99, 1N90, 1085, 1080, 1070, 1060, 1050, 1230, 1N30, 1100, 1200, 1N00, 2011, 2014, 2017, 2117, 2018, 2218, 2618, 2219, 2024, 2025, 2N01, 3003, 3203, 3004, 3104, 3005, 3105, 4032, 5005, 5052, 5652, 5154, 5254, 5056, 5082, 5182, 5083, 5086, 5N01, 5N02, 6101, 6003, 6151, 6061, 6N01, 6063, 7003, 7N01, 7050, 7072, 7075), titanium or its alloy (JIS first class, JIS second class, JIS third class, Ti-0.15Pd, Ti-0.3Mo-0.8Ni, Ti-5Ta, etc.) nickel or its alloy, copper or its alloy, monel, Inconel, Hastelloy, nickel-plated iron, etc.

It is preferable to set up a safety valve system between the sealing plate and the cap, and/or at a part of the battery can, and/or at the gasket. Examples of the safety valve include a flexible thin-layer-type safety valve (examined and published Japanese utility model publication No. 15398/1984, a pressure-control-valve-type safety valve (those described in the prior art section of JP-A No. 75930/1976, and those described in JP-A No. 328241/1992), an explosion-control-type gasket (JP-A No. 117063/1990), a thin-layer (membrane) stuck-type safety valve (JP-A No. 151152/1989), a thin-board (the bottom of can)-type safety valve (JP-A No. 285853/1988), a ball-blockade-type safety valve (JP-A No. 32852/1988), a flexible-sealing-plate-type safety valve (JP-A No. 288063/1990), a chink-type safety valve (JP-A No. 230353/1985), a tabular safety valve (JP-A No. 81761/1988), a cup-shaped safety valve (JP-A No. 188853/1986), a screw-type safety valve (JP-A No. 50434/1974), and a bag-type safety valve (JP-A No. 139850/1990). Preferably among them are the pressure-control-type safety valve, the flexible thin-layer-type safety valve, and the flexible-sealing-plate-type safety valve.

A safety element, such as a PTC element and/or a thermal fuse, and/or a fuse, and/or a current breaking element, may be equipped to the inside of the battery according to the present invention, and/or to a cap, and/or to the bottom of a can, and/or to a conductive connection part of the outside.

Several methods may be used to seal the battery of the present invention. One methods is to arrange an insulating seal body between a metallic can that also serves as a terminal, and a metallic lid or pin that also serves as another terminal. In this method, the sealing is carried out generally by piling of a metallic can, an insulating seal body, a lid, or a pin, followed by plastic deformation of the insulating seal body in the pushed and pressed direction according to the power applied to the opening part of the battery (or one side of the pin). These plastic deformations are called crimp seal and caulking seal. Another method for is to employ a hermetic seal, so that the seal may not provide insulation. In this method, since a hematic seal is generally set up to the lid, the center and the outside of the lid do not provide insulation. Therefore, the insulating seal body is not necessary when the vicinity of the lid is connected with the metallic can. Further, in this case, a resistance welding and a laser welding, etc., may be employed for the connection of the vicinity of the lid.

The battery according to the present invention, if necessary, may be pressed the battery can after, before, or during the sealing, to make its diameter smaller. More specifically, the battery can may be formed by preliminarily making its diameter have an additional length of from 50 µm to 300 µm as compared to the finished size, and then re-adjusting the diameter to the prescribed diameter, by pressing the battery can after the sealing.

The battery of the present invention, if necessary, may be provided an insulating plate or an insulating coating layer at the vicinity of the cap, after sealing.

The components (a positive electrode collector, a negative electrode collector, a positive electrode lead tab, a negative electrode lead tab, a separator, a roll core, an insulating plate, a gasket, a battery case (can), a sealing plate, a cap, a safety valve, a safety element, etc.) can be used after washing and/or drying, if necessary. For the washing, preferably use can be made of water, Freon, acetone, alcohol, etc. Further, ultrasonics is preferably used for the washing. The drying can be carried out by blowing hot air of 30° C. to 100° C., or by reducing pressure. Radiation, such as far-infrared rays and a microwave, may be applied, when occasion demands.

The components (a roll core, an insulating plate, a gasket, a battery case (can), a sealing plate, a cap, a safety valve, etc.), if necessary, can be used after testing and selection of their tolerance in size, degree of cylinder, roundness, straightness, parallelism, etc. Further, if necessary, the above-mentioned components, manufactured so that their tolerance in size, degree of cylinder, roundness, straightness, parallelism, etc. may be within the prescribed range, can be used. The tolerance in size is preferably 0.1 mm or less, more preferably 0.03 mm or less; the degree of cylinder is preferably 0.1 mm or less, more preferably 0.03 mm or less; roundness is preferably 0.1 mm or less, preferably 0.03 mm or less; the straightness is preferably 0.1 mm or less, more preferably 0.03 mm or less; and the parallelism is preferably 0.1 mm or less, more preferably 0.03 mm or less.

The sealed battery of the present invention, if necessary, may be washed and dried. For the washing, preferably use can be made of water, Freon, acetone, alcohol, etc. Further, ultrasonics is preferably used for the washing. The drying can be carried out by blowing hot air of 30° C. to 100° C., or by reducing pressure. Radiation, such as far-infrared rays and a microwave, may be applied, when occasion demands. Further, after the washing, droplets of the solvent for the washing may be removed by applying centrifugal force or a strong air blow to the components.

The battery of the present invention, if necessary, may be subjected to a post-treatment. For example, a circuit voltage measurement, an internal resistance measurement, charging, discharging, a heat treatment at a temperature of from 20° to 90° C. for a period of from 1 hour to 30 days, a capacity selection, a circuit voltage selection, and an internal resistance selection, can be carried out solely or in combination.

The battery of the present invention, if necessary, may be covered with a wrapping material. As wrapping materials, there can be mentioned a heat contraction tube, an adhesive tape, a paper, a cloth, a paint, and a plastic case. Further, a part that changes color by heat may be provided on at least a part of such a wrapping material or a pack of the battery, so that heat hysteresis can be observed during its use.

The battery of the present invention, if necessary, may be contained in a pack by itself or in a combination of two or more batteries, which are connected in series or in a parallel circuit. Examples of a plurality of the multiple combined batteries include from 2 to 6 batteries, which are connected in series, or in a parallel circuit, respectively. Further, to this battery pack may be set up a safety element, such as a PTC element, and/or a thermal fuse, and/or a fuse, and/or a current-breaking element; and a safety circuit, which monitors the overall voltage, temperature, and electric current, etc., of each of single batteries and/or combined batteries, and which has a function to break the electric current, if necessary. Further, to the battery pack may be set up at least one of a positive electrode terminal of each of single batteries, a negative electrode terminal of each of single batteries, a temperature-detecting terminal of each of single batteries, a temperature-detecting terminal of the multiple combined batteries, a current-detecting terminal of the multiple combined batteries, a pressure-detecting terminal of each of single batteries, etc., as an external terminal, in addition to a positive electrode terminal of the multiple combined batteries and a negative electrode terminal of the multiple combined batteries. Further, instead of the external terminal, it is possible to generate inside a signal indicating information that will be conveyed by the external terminal, and to receive the signal outside. It is preferable to employ electromagnetic wave for the signal. Further, a positive electrode terminal of the multiple combined batteries, or a negative electrode terminal of the multiple combined batteries, is preferably used for conveyance of the signal. Further, a voltage converter (DC-DC converter, etc.) circuit may be built in the battery pack. The joint of each of single batteries may be carried out by rigidly fixing a lead plate with a weld, or by fixing in such a fashion that the lead plate is readily removable by means of a socket or the like. Further, the order of the joint may be definite, or it may be changeable with a switch element, so that the joint may be in series or in a parallel circuit at the charging time or discharging time, if necessary. Moreover, an indicating function for, for example, the remaining capacity of the battery, the presence of charge, and the number of use, may be set up to the battery pack.

The battery of the present invention can be charged in a form of a single battery or a multiple combined batteries. When the single battery is charged, the charge may be done at a definite current, such as 500 mA, and terminated at a definite voltage, such as 4.3 V. Alternatively, the charge may be done at the above-mentioned definite current until a charging voltage reaches the above-mentioned definite voltage, followed by a charging current being gradually reduced while maintaining the above-said definite voltage, and then by a termination at a definite current or after the lapse of a definite time. When the multiple combined battery is charged, the charge may be done at a definite current, such as 500 mA, and terminated at a definite voltage, such as 4.3 V. Alternatively, the charge may be done at the above-mentioned definite current until a charging voltage reaches the above-mentioned definite voltage, followed by a charging current being gradually reduced while maintaining the above-said definite voltage, and then by a termination at a definite current or after the lapse of a definite time. In this case, the charge may be controlled according to the situation of the inside of the battery pack, which is obtained by a terminal and a signal.

The application of the nonaqueous secondary battery of the present invention is not particularly limited. For example, it has utility in electronic equipment, such as notebook-size color or monochromatic personal computers, pen-input personal computers, pocket-size (palm top) personal computers, notebook-size word processors, pocket-size word processors, electronic book players, pocket phones, wireless extensions of key telephone sets, pagers, handy terminals, portable facsimiles, portable copying machines, portable printers, headphone stereos, video cameras, liquid crystal TV sets, handy cleaners, portable CD players, mini disk systems, electrical shavers, machine translation systems, land mobile radio-telephones, transceivers, electrical tools, electrical pocket notebooks, portable calculators, memory cards, tape recorders, radios, backup powers, memory cards, and so on. In addition, it has utility in electronic equipment for people's daily living such as automobiles, electrically powered vehicles, motors, lights, toys, family (home) computers (game equipment), load conditioners, irons, watches, clocks, stroboscopic lamps, cameras, medical equipments (e.g. pacemakers, hearing aids, and massage machines). Furthermore, it may also be used as a battery of military equipments or spacecraft equipments. The nonaqueous secondary battery of the present invention may be used in combination with solar batteries.

As demonstrated, the battery of the present invention uses an lithium-containing transition metal oxide, as a positive-electrode-active material, and an oxide mainly comprising at least one of semimetals of the group IVB or VB of the periodic table, as a negative-electrode-active material. Further, as a positive-electrode-active material, the battery of the present invention uses a cobalt oxide, having an average grain size region (D) represented by the formula:

$$3 < D \leq 9.0 \, \mu m,$$

with a volume, which is occupied by grains having a grain size of from 3 to 150 µm, being not less than 75% of the total volume. The thus provided battery of the present invention is a safe nonaqueous secondary battery having a high discharge potential, a large discharge capacity, and satisfactory charge-and-discharge cycle characteristics, without fluctuation between lots.

The present invention will now be illustrated in greater detail with reference to Examples, but the present invention should not be construed as being limited thereto.

Preparation Example of the Positive-Electrode-Active Material:

Lithium carbonate and cobalt oxide (a mixed raw material of $Co_3O_4$ and CoO, having an average grain size 4.2 µm) were mixed at the proportion of the atomic ratio of lithium and cobalt being 1:1. The density of the mixture was 0.75 g/cm$^3$. The mixture was calcined in air at 750° C. for 3 hours, and then at 900° C. for 6 hours, to obtain LiCoO$_2$ (Compound 1-A). This was pulverized using a high speed air stream impingement process, to make the average particle size being 8.6 µm and the specific surface area being 0.45 m$^2$/g. The volume, which was occupied by particles having a size of 3 to 15 µm, was 87% based on the total volume of the pulverized particles. Neither particles of 1 µm or less, nor those of 25 µm or greater, were observed. The particle size and the volume were measured by a diffraction-type grain size distribution meter (manufactured by Horiba Seisakusho; LA500). Further, none of $Co_3O_4$ was observed by a X ray diffraction. Moreover, none of $Li_2CO_3$ was found from FT-IR.

In the same manner, a stoichiometrical amount of raw materials for each Compound were mixed, calcinated and pulverized, to obtain $Li_{0.97}CoO_z$ (Compound 1-B), $LiCo_{0.9}Ni_{0.1}O_z$ (Compound 1-C), $LiCo_{0.95}V_{0.05}O_z$ (Compound 1-D), $LiCo_{0.98}V_{0.02}O_z$ (Compound 1-E), $LiCo_{0.75}Fe_{0.25}O_z$ (Compound 1-F), $LiCo_{0.75}Mn_{0.25}O_z$ (Compound 1-G), $LiCo_{0.85}Mn_{0.15}O_z$ (Compound 1-H), $LiCo_{0.95}Mn_{0.05}O_z$ (Compound 1-I), $Li_{1.02}Co_{0.97}Mn_{0.03}O_z$ (Compound 1-J), $LiCo_{0.97}Ti_{0.03}O_z$ (Compound 1-K), $LiCo_{0.97}Cu_{0.03}O_z$ (Compound 1-K), $LiCo_{0.97}Cu_{0.03}OZ$ (Compound 1-L), wherein Z is a number in a range of 1.7 to 2.3, having characteristics as shown in Table 1, respectively.

Symbols used in Table 1 have the following meanings: (a) number of positive-electrode-active material, (b) average grain size (μm), (c) specific surface area (m$^2$/g), (d) volume (%), which is occupied by particles having a size of 3 to 15 μm, based on the total volume, (e) volume (%), which is occupied by particles having a size of 1 μm or less, based on the total volume, and (f) volume (%), which is occupied by particles having a size of 25 μm or greater, based on the total volume.

Preparation Example of the Positive-Electrode-Active Material for Comparison:

Lithium carbonate and cobalt carbonate were mixed at the proportion of the atomic ratio of lithium and cobalt being 1:1, and the obtained mixture was calcined in air at 750° C. for 8 hours, to obtain $LiCoO_2$ (Compound R-1).

Lithium carbonate and cobalt carbonate were mixed at the proportion of the atomic ratio of lithium and cobalt being 1:1, and the obtained mixture was calcined in air at 900° C. for 8 hours, to obtain $LiCoO_2$ (Compound R-2).

Lithium carbonate, cobalt carbonate and vanadium pentoxide were mixed at the proportion of the atomic ratio of lithium, cobalt and vanadium being 1:068:0.32, and then the obtained mixture was calcined in air at 900° C. for 8 hours, to obtain $LiCo_{0.68}V_{0.32}O_{2.96}$ (Compound R-3).

Symbols used in Table 1 for the above Compounds for comparison have the same meanings as defined above.

TABLE 1

| (a) | (b) | (c) | (d) | (e) | (f) |
| --- | --- | --- | --- | --- | --- |
| 1-A | 8.6 | 0.45 | 87 | 0 | 0 |
| 1-B | 5.5 | 0.67 | 87 | 0 | 0 |
| 1-C | 4.4 | 0.78 | 85 | 0 | 0 |
| 1-D | 5.7 | 0.59 | 82 | 0 | 0 |
| 1-E | 6.8 | 0.44 | 88 | 0 | 0 |
| 1-F | 3.4 | 1.52 | 76 | 2 | 0 |
| 1-G | 5.8 | 0.48 | 80 | 0.4 | 0 |
| 1-H | 6.4 | 0.46 | 85 | 0 | 0 |
| 1-I | 7.3 | 0.35 | 88 | 0 | 0 |
| 1-J | 8.2 | 0.23 | 87 | 0 | 0 |
| 1-K | 7.6 | 0.09 | 85 | 0 | 0 |
| 1-L | 7.1 | 0.13 | 84 | 0 | 0 |
| R-1 | 2.2 | 3.22 | 70 | 8 | 0 |
| R-2 | 15.8 | 0.02 | 72 | 0 | 8 |
| R-3 | 8.5 | 0.55 | 68 | 4 | 2 |

Symbols used in the below Tables 2 to 4 have the following meanings:
(g) number of positive-electrode-active material, (1) negative-electrode-active material precursor, (h) discharge capacity in the first cycle (mAh/ml-cylindrical battery volume), (i) average potential (V) of lithium deintercalation, (j) cycle characteristics (the number of the cycles at which the lithium deintercalation capacity was reduced to 80% of that of the first cycle), (k) rate of generation of short circuit per 500 cases of cylindrical battery.

As SnO, GeO, PbO, $PbO_2$, $Sb_2O_3$, and $Bi_2O_3$, were used commercially available ones.

Preparation of $SnO_2$:

Sn $(OH)_4$ synthesized from $SnCl_4$ and NaOH was calcined in air at 400° C. for 4 hours, to obtain $SnO_2$, and the resulting $SnO_2$ was ground in a mortar, to make the average primary-particle size being about 0.05 μm (rutile structure).

Preparation of $SnSiO_3$:

SnO and $SiO_2$ were mixed, and then the mixture was calcined in an argon atmosphere at 1000° C. for 10 hours, to obtain $SnSiO_3$. The calcined product was pulverized in a jet mill, to make the average particle size being 5 μm.

Preparation of $Li_2SnO_3$:

SnO and $Li_2CO_3$ were mixed at the proportion of the ratio of Sn and Li being 1:2, and then the mixture was calcined in air at 1000° C. for 12 hours, to obtain $Li_2SnO_3$. The calcined product was pulverized in a jet mill, to make up the average particle size being 3 μm.

EXAMPLE 1

A mixture of 86 weight % of SnO, as a negative-electrode-active material precursor, 6 weight % of crystalline flake graphite, and 3 weight % of acetylene black was mixed with 4 weight % of an aqueous dispersion of a styrene-butadiene rubber and 1 weight % of carboxymethyl cellulose, as binders. The resulting mixture was kneaded using water, as a medium, to prepare a slurry. The slurry was extrusion coated on both sides of a 18 μm thick copper foil. After drying the coated foil, it was compression-molded by calendering. The compression molded sheet was cut to a prescribed size (width and length), to prepare a long, narrow strip of negative electrode sheet. The thickness of the negative electrode sheet was 124 μm.

A mixture of 87 weight % of 1-A, as a positive-electrode active material, 6 weight % of crystalline graphite, 3 weight % of acetylene black, and as binders, 3 weight % of an aqueous dispersion of polytetrafluoroethylene and 1 weight % of sodium polyacrylate was kneaded with water as a medium. The resulting slurry was applied on both sides of a 20 μm thick aluminum foil, dried, compression-molded, and cut to the prescribed size in the same manner as described above, to prepare a long, narrow strip of 220 μm thick positive electrode sheet.

A nickel or aluminum lead plate was connected by spot welding to the end of the above-described negative electrode sheet or positive electrode sheet, respectively. After that, they were dehydrated and dried at 150° C. for 2 hours in a dry air having a dew point of not higher than −40° C.

The dehydrated and dried positive electrode sheet (5), a finely porous polypropylene film separator (trade name: Cell Guard 2400) (4), the dehydrated and dried negative electrode sheet (3), and a separator (4) were laminated in this order and spirally rolled up by means of a winder. In this time, as the roll core, a spiral winding's core of an insulating material (18) which was integrally composed of the spiral winding's core and a bottom insulating plate, was used.

The resulting roll was put in cylindrical open-top battery case (2), made of nickel-plated iron, which also served as a negative electrode terminal. Then a 1 mol/l of $LiPF_6$ (6), as an electrolyte, in a 2:2:6 (by volume) mixture of ethylene carbonate, butylene carbonate, and dimethyl carbonate was poured into the case (2). Battery cover (positive electrode cup) (8), also functioning as a positive electrode terminal, was caulked into the top of the case via an insulating gasket (1) made of synthetic resins (polypropylene), to prepare a cylindrical battery. The positive electrode terminal (8) and the positive electrode sheet (5) were previously connected through a lead terminal of a positive electrode lead (15, 16). The positive electrode lead (16) was a part of the positive electrode lead (15), adhered with an insulating (friction) tape. The battery case (2) and the negative electrode sheet (3) were previously connected through a lead terminal of a negative electrode lead (17). A sealing plate (10), having a hole (11) for a safety valve (7), together with a ring-shaped PTC element (12), a ring (13), and an insulating ring (14), were previously set between the gasket (1) and the battery cover (8). An upper insulating plate (19) was put on the said roll in the case. The battery cover (8) had an exhaust port (9) for the safety valve. Further, an insulating plate (19) was set around the battery cover (8). The cross section of the thus assembled cylindrical battery of the present invention is shown in FIGURE 1.

The charging and discharging conditions were 4.3 to 2.7 V and 1.25 mA/cm$^2$. The results of this battery, and also those obtained by using 1-B, 1-C, 1-D, 1-E, 1-F, 1-G, 1-H, 1-I, 1-j or 1-L, as a positive-electrode-active material, are shown in Table 2.

TABLE 2

| No. | (g) | (h) | (i) | (j) | (k) |
|---|---|---|---|---|---|
| 1 | 1-A | 357 | 3.54 | 127 | 0 |
| 2 | 1-B | 350 | 3.51 | 129 | 0 |
| 3 | 1-C | 359 | 3.46 | 120 | 0 |
| 4 | 1-D | 363 | 3.44 | 137 | 0 |
| 5 | 1-E | 362 | 3.49 | 139 | 0 |
| 6 | 1-F | 354 | 3.34 | 115 | 0 |
| 7 | 1-G | 348 | 3.32 | 118 | 0 |
| 8 | 1-H | 344 | 3.37 | 123 | 0 |
| 9 | 1-I | 349 | 3.43 | 125 | 0 |
| 10 | 1-J | 352 | 3.50 | 125 | 0 |
| 11 | 1-K | 340 | 3.47 | 110 | 0 |
| 12 | 1-L | 341 | 3.44 | 116 | 0 |

EXAMPLE 2

The cylindrical batteries were assembled and tested in the same manner as in Example 1, except for using $SnO_2$, GeO, PbO, $PbO_2$, $Sb_2O_3$, $Bi_2O_3$, $SnSiO_3$, or $Li_2SnO_3$, as a negative-electrode-active material, and 1-A, as a positive-electrode-active material. The results obtained are shown in Table 3.

TABLE 3

| No. | (l) | (h) | (i) | (j) | (k) |
|---|---|---|---|---|---|
| 1 | $SnO_2$ | 295 | 3.44 | 142 | 0 |
| 2 | GeO | 221 | 3.49 | 119 | 0 |
| 3 | PbO | 177 | 3.50 | 107 | 0 |
| 4 | $PbO_2$ | 167 | 3.44 | 139 | 0 |
| 5 | $Bi_2O_3$ | 184 | 3.22 | 119 | 0 |
| 6 | $Li_2SnO_3$ | 206 | 3.37 | 155 | 0 |
| 7 | $SnSiO_3$ | 288 | 3.65 | 161 | 0 |
| 8 | $Sb_2O_3$ | 236 | 3.07 | 120 | 0 |

COMPARATIVE EXAMPLE 1

The cylindrical batteries were assembled and subjected to the charge and discharge test in the same manner as in Example 1, except for using R-1, R-2, or R-3, as a positive-electrode-active material, and SnO, as a negative-electrode-active material, or replacing the compound, as a positive-electrode-active material, with Compound 1-A, 1-D or 1-I, and the compound, as a negative-electrode-active material, with rutile type $WO_2$ or spinel type $Fe_3O_4$. The results obtained are shown in Table 4.

TABLE 4

| No. | (g) | (l) | (h) | (i) | (j) | (k) |
|---|---|---|---|---|---|---|
| 1 | R-1 | SnO | 265 | 3.41 | 62 | 1 |
| 2 | R-2 | SnO | 248 | 3.39 | 79 | 4 |
| 3 | R-3 | SnO | 217 | 3.35 | 84 | 3 |
| 4 | 1-A | $WO_2$ | 107 | 3.39 | 54 | 0 |
| 5 | 1-D | $WO_2$ | 94 | 3.22 | 69 | 0 |
| 6 | 1-I | $WO_2$ | 96 | 3.27 | 55 | 0 |
| 7 | 1-A | $Fe_2O_3$ | 88 | 3.35 | 61 | 0 |

In comparison of the results of Examples 1 and 2 with those of Comparative example 1, it is found that secondary batteries of the present invention provide high discharge voltage, excellent charge/discharge cycle characteristics, large discharge volume, and low rate of short circuit.

EXAMPLE 3

The following compounds were used as a negative-electrode active material.

(a-1) SnO, (a-2) GeO, (a-3) $GeO_2$, (a-4) PbO, (a-5) $PbO_2$, (a-6) $Pb_2O_3$, (a-7) $Pb_3O_4$, (a-8) $Sb_2O_3$, (a-9) $Sb_2O_4$, (a-10) $Bi_2O_3$, (a-11) $SnO_2$, (a-12) $Li_2SnO_3$, (a-13) $Li_2GeO_3$, (a-14) $LiPbO_3$, (a-15) $Li_3BiO_4$, (a-16) $Li_3SbO_4$, (a-17) $Li_2ZnO_2$, (a-18) $Li_3InO_3$, (a-19) $Li_2ZnSn_2O_6$, (a-20) $Li_{0.1}SnO_{2.05}$, (a-21) $Li_{0.5}SnO_{2.25}$, (a-22) $Li_4SnO_4$, (a-23) $Li_6SnO_5$, (a-24) $Li_8SnO_6$, (a-25) $Li_2SnO_2$, (a-26) $Li_{0.1}SnO_{1.05}$, (a-27) $Li_{0.5}SnO_{1.25}$, (a-28) $LiSnO_{2.5}$, (a-29) $Li_4SnO_4$, (a-30) $Li_8SnO_5$, (a-31) $SiSnO_3$

Compounds a-1 to a-10 used herein are commercially available ones.

Preparation of Compound a-11

$Sn(OH)_4$ synthesized from $SnCl_4$ and NaOH was calcinated in air at 400° C. for 4 hours, to obtain $SnO_2$, and the resulting $SnO_2$ was ground in a mortar, to make the average primary-particle size being about 0.05 μm (rutile structure).

Preparation of Compound a-12

Lithium carbonate (7.3 g) and tin dioxide (15.1 g) were dry blended, put in an alumina crucible, calined in air at 1000° C. for 12 hours, cooled to room temperature, and taken out from the calcination furnace, to obtain $Li_2SnO_3$. The calined product was pulverized in a jet mill, to make the average particle size being 3 μm.

Stoichiometric amounts of raw materials for each Compound was mixed, calcined, and pulverized, respectively, in the same manner as described above, to obtain Compounds a-13 to a-24.

Preparation of Compound a-25

Lithium acetate dihydrate (10.2 g) and tin monoxide (13.5 g) were dry blended, put in a porcelain crucible, calcined in argon atmosphere at 350° C. for 24 hours, cooled to room temperature, and taken out from the calcination furnace, to obtain $Li_2SnO_2$. The calcined product was pulverized in a jet mill, to make the average particle being 2.5 μm.

Stoichiometric amounts of raw materials for each Compound was mixed, calcined, and pulverized, respectively, in the same manner as described above, to obtain Compounds a-26 to a-30.

Preparation of Compound a-31

Tin monoxide (13.5 g) and silicon dioxide (6.0 g) were dry blended, put in an alumina crucible, subjected to heating-up to 1000° C. at 10° C./minutes in argon atmosphere, calined at 1000° C. for 12 hours, cooled to room temperature at 6° C./min, and taken out from the calcination furnace, to obtain SnSiO₃. SnSiO3. The calcined product was crude-pulverized and pulverized in a jet mill, to make the average particle being 5 μm.

A mixture of 86 weight % of the above-described negative-electrode-active material, 3 weight % of acetylene black, as a conductive agent, and 6 weight % of graphite was mixed with 4 weight % of an aqueous dispersion of a styrene-butadiene rubber and 1 weight % of carboxymethylcellulose, as binders. The mixture was kneaded using water, as a medium, to prepare a slurry. The slurry was doctor-blade coated on both sides of a 18 μm thick copper foil. After drying the coated foil, it was compression-molded by calendering. The compression-molded sheet was cut to a prescribed size, to prepare a long, narrow strip of negative electrode sheet. The thickness and width of the compression-molded negative sheet was 81 μm and 44 mm, respectively.

A mixture of 87 weight % of LiCoO$_2$, as a positive-electrode-active material, 9 weight % of graphite, as a conductive agent, and as binders, 3 weight % of polytetrafluoroethylene and 1 weight % of sodium polyacrylate was kneaded with water, as a medium. The resulting slurry was applied on both sides of a 20 μm thick aluminum foil support (collector). The coated foil was dried, compression-molded by calendering, and cut to the prescribed size in the same manner as described above, to prepare a long, narrow strip of positive electrode sheet. The thickness and width of the compression-molded negative sheet was 250 μm and 40 mm, respectively.

A nickel or aluminum lead plate was connected by spot welding to the end of the above-described negative electrode sheet or positive electrode sheet, respectively. After that, they were subjected to heat treatment at 200° C. for 2 hours in a dry air having a dew point of not higher than −40° C. The heat treatment was carried out by means of far-infrared heater.

The heat-treated positive electrode sheet, a finely porous polypropylene separator (Cell Guard 2400), the heat-treated negative electrode sheet and a separator were laminated in this order and spirally rolled up by means of a winder.

The roll was put in cylindrical open-top battery case, made of nickel-plated iron, which also served as a negative electrode terminal. Then a 1 mol/l of LiPF$_6$, as an electrolyte, in a 2:8 (by volume) mixture of ethylene carbonate and diethyl carbonate was poured into the case. Battery cover having a positive electrode terminal was caulked into the top of the case via gasket, to prepare a cylindrical battery. The positive electrode terminal and the positive electrode sheet were previously connected through a lead terminal; and the battery case and the negative electrode sheet were connected in the same way (battery Nos. 1 to 31). Five (5) cases of each of batteries were prepared.

REFERENCE EXAMPLE 1

Batteries were prepared in the same manner as in Example 3, except that the width of the cut negative electrode sheet was changed to 40 mm (battery Nos. 32 to 62).

Five (5) cases of each of batteries (Nos. 1 to 62) were charged to 4.2 V, and then discharged to 2.8 V (at 100 mA), to measure discharge capacity (mAH).

(Within the meaning of comparison of Reference examples 1, 2, 3 and 4 to Examples 3, 4, 5, and 6, respectively, the Reference Examples 1, 2, 3, and 4 are referred to as "reference" examples.)

TABLE 5

| Negative- | Example 3 | | | Reference Example 1 | | |
|---|---|---|---|---|---|---|
| Electrode-Active Material Type or Rot | Battery No. | Discharge Capacity Average (mAh) | Standard Deviation of Discharge Capacity | Battery No. | Discharge Capacity Average (mAh) | Standard Deviation of Discharge Capacity |
| a - 1 | 1 | 640 | 26 | 32 | 630 | 51 |
| a - 2 | 2 | 650 | 38 | 33 | 610 | 138 |
| a - 3 | 3 | 550 | 31 | 34 | 510 | 66 |
| a - 4 | 4 | 540 | 19 | 35 | 530 | 40 |
| a - 5 | 5 | 510 | 21 | 36 | 500 | 37 |
| a - 6 | 6 | 510 | 35 | 37 | 470 | 152 |
| a - 7 | 7 | 530 | 32 | 38 | 490 | 121 |
| a - 8 | 8 | 530 | 29 | 39 | 510 | 87 |
| a - 9 | 9 | 520 | 22 | 40 | 510 | 64 |
| a - 10 | 10 | 490 | 26 | 41 | 470 | 42 |
| a - 11 | 11 | 630 | 27 | 42 | 640 | 39 |
| a - 12 | 12 | 610 | 18 | 43 | 600 | 26 |
| a - 13 | 13 | 500 | 34 | 44 | 470 | 96 |
| a - 14 | 14 | 450 | 25 | 45 | 420 | 71 |
| a - 15 | 15 | 460 | 28 | 46 | 450 | 53 |
| a - 16 | 16 | 480 | 39 | 47 | 440 | 111 |
| a - 17 | 17 | 450 | 33 | 48 | 450 | 64 |
| a - 18 | 18 | 490 | 28 | 49 | 490 | 61 |
| a - 19 | 19 | 480 | 36 | 50 | 470 | 44 |
| a - 20 | 20 | 440 | 32 | 51 | 420 | 57 |
| a - 21 | 21 | 480 | 35 | 52 | 450 | 83 |
| a - 22 | 22 | 460 | 30 | 53 | 440 | 46 |
| a - 23 | 23 | 610 | 19 | 54 | 610 | 32 |
| a - 24 | 24 | 620 | 27 | 55 | 610 | 35 |
| a - 25 | 25 | 630 | 21 | 56 | 620 | 31 |
| a - 26 | 26 | 630 | 31 | 57 | 610 | 49 |
| a - 27 | 27 | 640 | 20 | 58 | 620 | 40 |
| a - 28 | 28 | 660 | 34 | 59 | 650 | 39 |
| a - 29 | 29 | 650 | 38 | 60 | 650 | 105 |
| a - 30 | 30 | 650 | 32 | 61 | 640 | 55 |
| a - 31 | 31 | 620 | 29 | 62 | 630 | 60 |

EXAMPLE 4

Batteries were prepared in the same manner as in Example 3, except for replacing the separator with a finely porous polypropylene sheet (porosity 38%, maximum aperture 0.125 μm (the major axis) −0.05 μm (the minor axis), thickness 25 μm, trade name: Cell Guard 2400 manufactured by Daicel Chemical Industry Co., Ltd.), and changing the width of the cut negative electrode sheet to 42 mm. Five (5) cases of each of batteries were also prepared.

REFERENCE EXAMPLE 2

Batteries were prepared in the same manner as in Example 4, except for replacing the separator with a finely porous polypropylene sheet (porosity 45%, maximum aperture 0.25 μm (the major axis)−0.075 μm (the minor axis), thickness 25 μm, trade name: Cell Guard 2500).

TABLE 6

| Negative- | Example 4 | | | Reference Example 2 | | |
|---|---|---|---|---|---|---|
| Electrode-Active Material Type or Rot | Battery No. | Discharge Capacity Average (mAh) | Standard Deviation of Discharge Capacity | Battery No. | Discharge Capacity Average (mAh) | Standard Deviation of Discharge Capacity |
| a - 1 | 63 | 640 | 23 | 70 | 640 | 25 |
| a - 6 | 64 | 500 | 30 | 71 | 510 | 39 |
| a - 11 | 65 | 640 | 28 | 72 | 640 | 52 |
| a - 16 | 66 | 490 | 35 | 73 | 480 | 46 |

TABLE 6-continued

| Negative- Electrode- Active Material Type or Rot | Example 4 | | | Reference Example 2 | | |
|---|---|---|---|---|---|---|
| | Battery No. | Discharge Capacity Average (mAh) | Standard Deviation of Discharge Capacity | Battery No. | Discharge Capacity Average (mAh) | Standard Deviation of Discharge Capacity |
| a - 21 | 67 | 480 | 35 | 74 | 470 | 69 |
| a - 26 | 68 | 620 | 26 | 75 | 620 | 31 |
| a - 31 | 69 | 620 | 20 | 76 | 630 | 54 |

EXAMPLE 5

Batteries were prepared in the same manner as in Example 4, except for replacing the separator with a laminate composed of two finely porous polypropylene sheets (porosity 38%, maximum aperture 0.125 μm (the major axis) −0.05 μm (the minor axis), thickness of each sheet 25 μm, trade name: Cell Guard 2402 manufactured by Daicel Chemical Industry Co., Ltd.).

Five (5) cases of each of batteries were also prepared.

REFERENCE EXAMPLE 3

Batteries were prepared in the same manner as in Example 5, except for replacing the separator with a finely porous polypropylene sheet (porosity 38%, maximum aperture 0.125 μm (the major axis) −0.05 μm (the minor axis), thickness 25 μm, trade name: Cell Guard 2400 manufactured by Daicel Chemical industry Co., Ltd.).

TABLE 7

| Negative- Electrode- Active Material Type or Rot | Example 5 | | | Comparative Example 3 | | |
|---|---|---|---|---|---|---|
| | Battery No. | Discharge Capacity Average (mAh) | Standard Deviation of Discharge Capacity | Battery No. | Discharge Capacity Average (mAh) | Standard Deviation of Discharge Capacity |
| a - 2 | 77 | 650 | 25 | 84 | 650 | 39 |
| a - 7 | 78 | 540 | 22 | 85 | 550 | 30 |
| a - 12 | 79 | 600 | 19 | 86 | 610 | 20 |
| a - 17 | 80 | 450 | 16 | 87 | 450 | 35 |
| a - 22 | 81 | 460 | 18 | 88 | 460 | 26 |
| a - 27 | 82 | 630 | 15 | 89 | 630 | 17 |
| a - 30 | 83 | 640 | 20 | 90 | 630 | 34 |

EXAMPLE 6

Batteries were prepared in the same manner as in Example 1, except that the cut end of the positive electrode was closely examined and the existing burrs were cut off with glass knife, so that the length of the burr in the thickness direction of the electrode may be reduced to about 10 to 20% of the thickness of the electrode. Five (5) cases of each of batteries were also prepared.

REFERENCE EXAMPLE 4

When the cut end of the positive electrode assembled in the batteries of Example 3 was examined, it was found that the length of the burrs in the thickness direction of the electrode was about 60 to 70% of the thickness of the electrode. These were used for this reference example.

TABLE 8

| Negative- Electrode- Active Material Type or Rot | Example 6 | | | Reference Example 4 | | |
|---|---|---|---|---|---|---|
| | Battery No. | Discharge Capacity Average (mAh) | Standard Deviation of Discharge Capacity | Battery No. | Discharge Capacity Average (mAh) | Standard Deviation of Discharge Capacity |
| a - 3 | 91 | 550 | 26 | 95 | 550 | 31 |
| a - 8 | 92 | 540 | 22 | 96 | 530 | 29 |
| a - 13 | 93 | 500 | 29 | 97 | 500 | 34 |
| a - 18 | 94 | 490 | 20 | 98 | 490 | 28 |

Having described our invention as related to the present embodiments, it is our intention that the invention not be limited by any of the details of the description, unless otherwise specified, but rather be construed broadly within its spirit and scope as set out in the accompanying claims.

What we claim is:

1. A nonaqueous secondary battery comprising a positive-electrode-active material, a negative-electrode-active material, and a nonaqueous electrolyte comprising a lithium salt, wherein the negative-electrode-active material comprises at least an oxide, wherein the oxide comprises at least one element selected from the group consisting of In, Zn, Mg, Ge, Sn, Pb, Sb, and Bi, which is capable of intercalating and deintercalating lithium, and wherein the positive-electrode-active material is represented by formula (A):

$$Li_xCo_{y1}M_{y2}O_z \quad (A)$$

where M represents an element selected from the group consisting of Ni, V, Fe, Mn, Ti and Cu; y1 represents a number from 0.75 to 1.0, and y2 represents a number of from 0.0 to 0.25, with the proviso that a total of y1 and y2 is 1; x represents a number from 0.7 to 1.20; and z represents a number of from 1.5 to 3.0, and wherein an average grain size (D) of the positive-electrode-active material is in a range of the following formula:

$$3 < D \leq 9.0 \ \mu m, \text{ and}$$

wherein a volume that is occupied by grains of the positive-electrode-active material having a grain size of from 3 to 15 μm is not less than 80% of the total volume and the volume having a grain size of smaller than 3 μm is 18% or less of the total volume, with substantially no grain size distribution in the range of 25 μm or larger.

2. The nonaqueous secondary battery as claimed in claim 1, wherein said negative-electrode-active material comprises at least an oxide wherein the oxide comprises at least one element selected from the group consisting of Ge, Sn, Pb, Bi, Si, In and Mg, which is capable of intercalating and deintercalating lithium.

3. The nonaqueous secondary battery as claimed in claim 1, wherein said negative-electrode-active material comprises an oxide wherein the oxide comprises Sn, which is capable of intercalating and deintercalating lithium.

4. The nonaqueous secondary battery as claimed in claim 1, wherein the negative-electrode-active material is formed from a precursor, wherein the precursor of the negative-electrode-active material comprises at least one oxide, wherein the oxide comprises the element Sn and has not undergone lithium intercalation and at least one oxide is a α-PbO-structure SnO or a rutile structure $SnO_2$.

5. The nonaqueous secondary battery as claimed in claim 1, wherein the negative-electrode-active material is formed from a precursor, and wherein lithium is intercalated into the precursor of the negative-electrode-active material by sending an electric current of 0.04 A or more per 1 g of the precursor into the precursor.

6. The nonaqueous secondary battery as claimed in claim 5, wherein the electric current is 0.04 A to 1 A per 1 g of the precursor.

7. The nonaqueous secondary battery as claimed in claim 1, wherein the nonaqueous electrolyte comprises an electrolytic solution in ethylene carbonate.

8. The nonaqueous secondary battery as claimed in claim 1, wherein the nonaqueous electrolyte comprises a lithium salt, wherein the lithium salt is a fluorine-containing compound.

9. The nonaqueous secondary battery as claimed in claim 1, wherein the positive-electrode-active material is $LiCoO_2$.

10. The nonaqueous secondary battery as claimed in claim 1, wherein the positive-electrode-active material has substantially no grain size distribution in the range of 1 μm or smaller.

* * * * *